(12) United States Patent
Takamatsu et al.

(10) Patent No.: US 8,499,873 B2
(45) Date of Patent: Aug. 6, 2013

(54) MOTOR DEVICE MOUNTED ON MOBILE BODY AND MOBILE BODY HAVING THE MOTOR DEVICE MOUNTED THEREON

(75) Inventors: Naoyoshi Takamatsu, Susono (JP); Daigo Kikuta, Aichi-ken (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 330 days.

(21) Appl. No.: 12/601,753

(22) PCT Filed: May 23, 2008

(86) PCT No.: PCT/JP2008/059959
§ 371 (c)(1), (2), (4) Date: Nov. 24, 2009

(87) PCT Pub. No.: WO2008/146897
PCT Pub. Date: Dec. 4, 2008

(65) Prior Publication Data
US 2010/0181861 A1 Jul. 22, 2010

(30) Foreign Application Priority Data
May 28, 2007 (JP) .................. 2007-140126

(51) Int. Cl.
*B60K 6/00* (2007.10)
*H02K 9/00* (2006.01)

(52) U.S. Cl.
USPC .......................................... 180/165; 310/58

(58) Field of Classification Search
USPC ................ 180/165, 302, 304, 305; 310/52, 310/58, 89
See application file for complete search history.

(56) References Cited

U.S. PATENT DOCUMENTS

| | | | | |
|---|---|---|---|---|
| 3,923,115 | A * | 12/1975 | Helling | 180/65.25 |
| 4,123,910 | A * | 11/1978 | Ellison, Sr. | 60/698 |
| 4,590,767 | A * | 5/1986 | Gardner, Jr. | 60/668 |
| 5,793,132 | A * | 8/1998 | Hirose et al. | 310/71 |
| 6,223,846 | B1 * | 5/2001 | Schechter | 180/165 |
| 6,311,486 | B1 * | 11/2001 | Negre et al. | 60/370 |
| 6,311,797 | B1 * | 11/2001 | Hubbard | 180/165 |
| 7,122,923 | B2 * | 10/2006 | Lafontaine et al. | 310/58 |
| 2002/0153178 | A1 * | 10/2002 | Limonius | 180/2.2 |
| 2005/0035673 | A1 * | 2/2005 | Lafontaine et al. | 310/58 |
| 2006/0158050 | A1 * | 7/2006 | Maeda et al. | 310/58 |

FOREIGN PATENT DOCUMENTS

| | | |
|---|---|---|
| JP | 61-196881 A | 9/1986 |
| JP | 4-185533 A | 7/1992 |
| JP | 8-000727 U | 4/1996 |

(Continued)

OTHER PUBLICATIONS

Notice of Allowance for related U.S. Appl. No. 12/602,008 mailed Mar. 22, 2013.

*Primary Examiner* — J. Allen Shriver, II
*Assistant Examiner* — James M Dolak
(74) *Attorney, Agent, or Firm* — Sughrue Mion, PLLC

(57) ABSTRACT

In a motor device 300 mounted on a mobile body, a pressurizing mechanism for increasing the pressure in a motor chamber 14 in which a motor is installed has a compressor 30, which is driven to rotate by an engine 20 serving as driving means for driving the mobile body, to produce compressed air for motor chamber pressurization, and the compressed air coming from the compressor 30 is fed into the motor chamber 14 through a pipe 72 almost constantly while the engine 20 is being driven.

8 Claims, 6 Drawing Sheets

FOREIGN PATENT DOCUMENTS

| | | |
|---|---|---|
| JP | 2001-327111 A | 11/2001 |
| JP | 2004-011456 A | 1/2004 |
| JP | 2004-196273 A | 7/2004 |
| JP | 2005-110418 A | 4/2005 |
| JP | 2005-153724 A | 6/2005 |
| JP | 2005-299797 A | 10/2005 |
| JP | 2006-288153 A | 10/2006 |

* cited by examiner

MOTOR DEVICE MOUNTED ON MOBILE BODY AND MOBILE BODY HAVING THE MOTOR DEVICE MOUNTED THEREON

TECHNICAL FIELD

The present invention relates to a motor device mounted on a mobile body and a mobile body having the motor device mounted thereon, and in particular, to a motor device mounted on a mobile body that prevents motor insulation deterioration caused by motor discharge under conditions that are below atmospheric pressure, and a mobile body having the motor device mounted thereon.

BACKGROUND ART

An insulation treatment is applied to a motor typically mounted in hybrid electric vehicles having a generator that generates electric power based on engine driving or regeneration, and a motor that operates using power supplied from a battery to drive driving wheels, or electric vehicles including such hybrid vehicles.

However, because a motor driven in hybrid electric vehicles or electric vehicles as described above has a higher voltage than a typical motor, and is at, for example, 500 V, when the hybrid electric vehicles or electric vehicles travel in, for example, a high-altitude area (for example, at high elevations above 4000 m), the pressure near the motor decreases, resulting in a situation where electronic discharge tends to occur in the air, and an insulation treatment film applied to the motor may deteriorate to cause insulation defects. Further, an inverter-driven motor may transiently have non-uniform voltage sharing, which concentrates voltage at a first coil that is closest to the inverter, and discharge may tend to occur.

Heretofore, there have been proposed devices that prevent entrance of water or dust resulting from a situation where a wheel motor of an electric vehicle has an internal pressure lower than an external air pressure. For example, Japanese Patent Publication No. JP 2005-153724 A proposes a system having a flood sensing means for sensing flooding of a motor for the purpose of water proofing, wherein the inside of the motor is pressurized in accordance with the output of the flood sensing means, and Japanese Patent Publication No. JP 4-185533 A proposes a structure wherein compressed air is supplied into a wheel motor from an air tank mounted in a vehicle so that a wheel motor internal pressure is made higher than an external air pressure by 0.02 MPa or more.

However, even if the inside of the motor is pressurized at the time of flooding, or a wheel motor internal pressure is made higher than an external air pressure by 0.02 MPa or more, the wheel motor internal pressure may be at one atmospheric pressure (0.1 MPa) or less when the vehicle travels in a high-altitude area, and in such cases, discharge may still occur, and a motor insulation treatment film may deteriorate.

DISCLOSURE OF INVENTION

The present invention was made in consideration of the foregoing problems, and an object of the present invention is to provide a motor device mounted on a mobile body that adjusts the motor internal pressure to a pressure at which discharge does not occur, to prevent motor insulation deterioration even when the vehicle travels in a high-altitude area, and a mobile body having the motor device mounted thereon.

In order to achieve the above-described object, a motor device mounted on a mobile body and a mobile body having the motor device mounted thereon according to the present invention have the following features.

(1) According to one aspect of the present invention, there is provided a motor device mounted on a mobile body, the motor device comprising a pressurizing mechanism for increasing a pressure in a motor chamber in which a motor is installed, wherein the pressurizing mechanism has a compressor which is driven to rotate by driving means for driving the mobile body to produce compressed air for motor chamber pressurization.

Because the compressor of the pressurizing mechanism for increasing the pressure in the motor chamber is driven using the driving means for driving the mobile body, the energy consumption of the motor device mounted on a mobile body can be reduced. Further, because the driving means already provided in the mobile body is used, the structure of the motor device mounted on a mobile body can be simplified.

(2) According to another aspect of the present invention, in the motor device mounted on the mobile body described above under (1), the driving means is an engine; and the compressor is a compressor which is driven to rotate by exhaust from the engine, to produce compressed air for motor chamber pressurization.

Because the compressor is driven by exhaust from the engine, as in the above, the energy consumption of the motor device mounted on a mobile body can be reduced, and because the engine already provided in the mobile body is used, the structure of the motor device mounted on a mobile body can be simplified.

(3) According to still another aspect of the present invention, in the motor device mounted on the mobile body described above under (1), the driving means is an engine; and the compressor is a compressor which is driven to rotate by an output shaft of the engine to produce compressed air for motor chamber pressurization.

Because the compressor is driven by the output shaft of the engine, as in the above, the energy consumption of the motor device mounted on a mobile body can be reduced, and because the engine already provided in the mobile body is used, the structure of the motor device mounted on a mobile body can be simplified.

(4) According to still another aspect of the present invention, there is provided a motor device mounted on a mobile body, the motor device comprising a pressurizing mechanism for increasing a pressure in a motor chamber in which a motor is installed, wherein the pressurizing mechanism has a compressor which is driven to rotate by the motor to produce compressed air for motor chamber pressurization.

Because the compressor is driven by the motor itself, as in the above, the energy consumption of the motor device mounted on a mobile body can be reduced. Further, because the motor device mounted on a mobile body has a compact structure, and does not take up much space when mounted on a mobile body, it may be applied to any type of mobile body, and provides increased versatility.

(5) According to still another aspect of the present invention, there is provided a motor device mounted on a mobile body, the motor device comprising a pressurizing mechanism for increasing a pressure in a motor chamber in which a motor is installed, wherein the pressurizing mechanism has a compressor which is driven by a dedicated motor to produce compressed air.

Because the compressor is driven by the dedicated motor, pressurization control can be performed only under conditions where discharge tends to occur as there is, for example, a drop in the internal pressure of the motor chamber, and it is possible to reduce energy loss.

(6) According to still another aspect of the present invention, there is provided a motor device mounted on a mobile body, the motor device comprising a pressurizing mechanism for increasing a pressure in a motor chamber in which a motor is installed, wherein the pressurizing mechanism has a compressor which uses relative wind to produce compressed air based on a ram pressure.

Discharge in a motor tends to occur when, for example, a vehicle is travelling at high speed in a high-altitude area (for example, at an altitude of 4000 m). Therefore, by employing a pressurizing mechanism which produces compressed air using a wind pressure applied to the front of a mobile body, or, in other words, a ram pressure, when it is travelling at high speed, the energy consumption of the motor device mounted on a mobile body is minimized, and because the motor device mounted on a mobile body has a compact structure, and does not take up much space when mounted on a mobile body, it may be applied to any type of mobile body, and provides increased versatility.

(7) According to still another aspect of the present invention, there is provided a motor device mounted on a mobile body, the motor device comprising a pressurizing mechanism for increasing a pressure in a motor chamber in which a motor is installed, wherein the pressurizing mechanism has a compressor which converts a braking force of the mobile body into a driving force to produce compressed air for motor chamber pressurization.

Because a braking force is used to increase the pressure in the motor chamber, the energy consumption of the motor device mounted on a mobile body can be reduced.

(8) According to still another aspect of the present invention, there is provided a mobile body having mounted thereon the motor device described above under any one of (1) to (7).

It is possible to provide a mobile body having mounted thereon a motor that inhibits motor insulation deterioration, and has excellent durability.

BEST MODE FOR CARRYING OUT THE INVENTION

Embodiments of the present invention will be described below with reference to the drawings.

Figure 1:
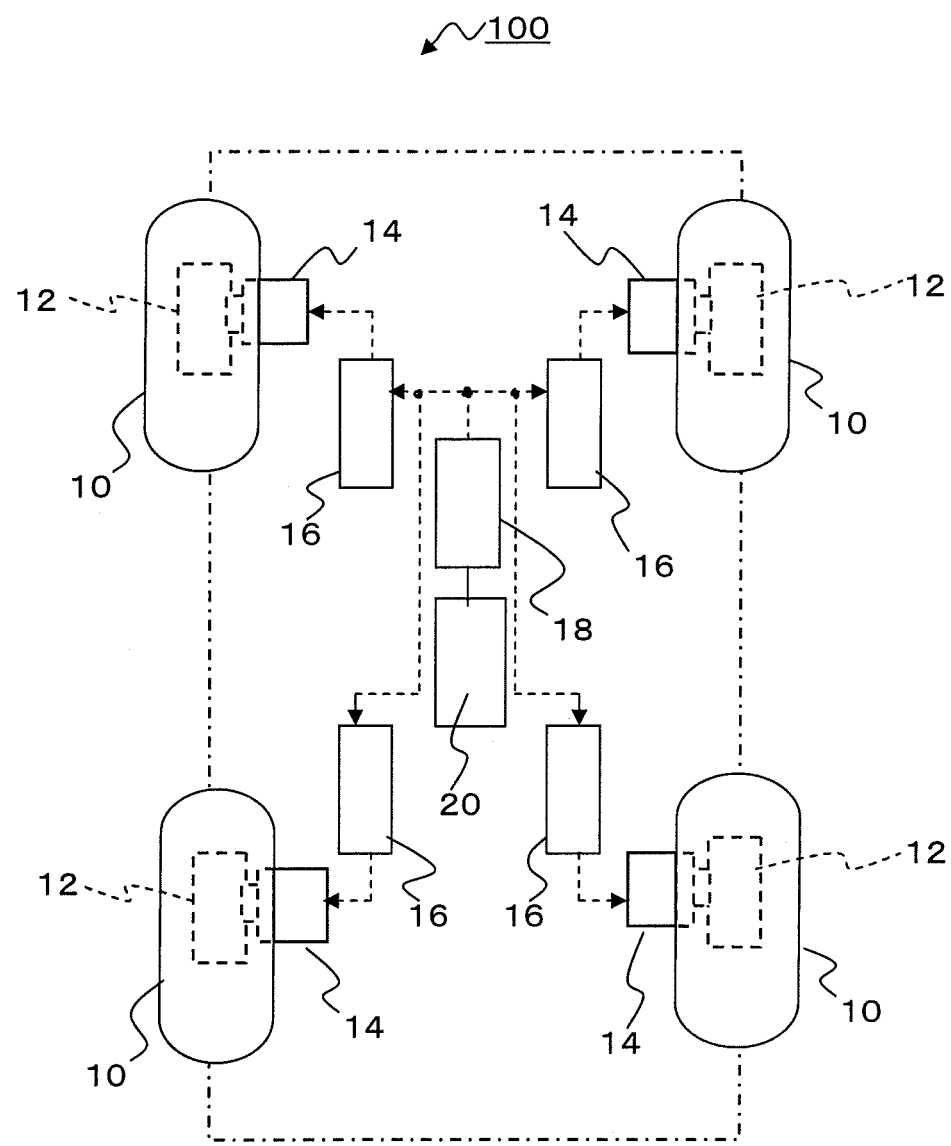
FIG. 1 is a structure diagram illustrating an example of a schematic structure of a mobile body having mounted thereon a motor device according to the present invention.

FIG. 1 shows an example of a structure of a hybrid electric vehicle or an electric vehicle according to an embodiment of the present invention. As shown in FIG. 1, a body 100 of a hybrid electric vehicle or an electric vehicle is provided with a plurality of travelling wheels 10, a plurality of motor chambers 14 in which motors for individually driving the respective travelling wheels 10 to rotate are installed, a generator 18 that supplies power to the motors installed in the plurality of motor chambers 14, an engine 20 that drives the generator 18, and inverters 16 that change the frequency of alternating-current power supplied from the generator 18 and supply it to the motors installed in the motor chambers 14. In addition, brake-equipped reduction gears 12 are each connected to a part of a shaft of the motors installed in the motor chambers 14, and the rotation of the shafts of the motors is decelerated by the brake-equipped reduction gears 12 and is transmitted to the travelling wheels 10.

Figure 2:
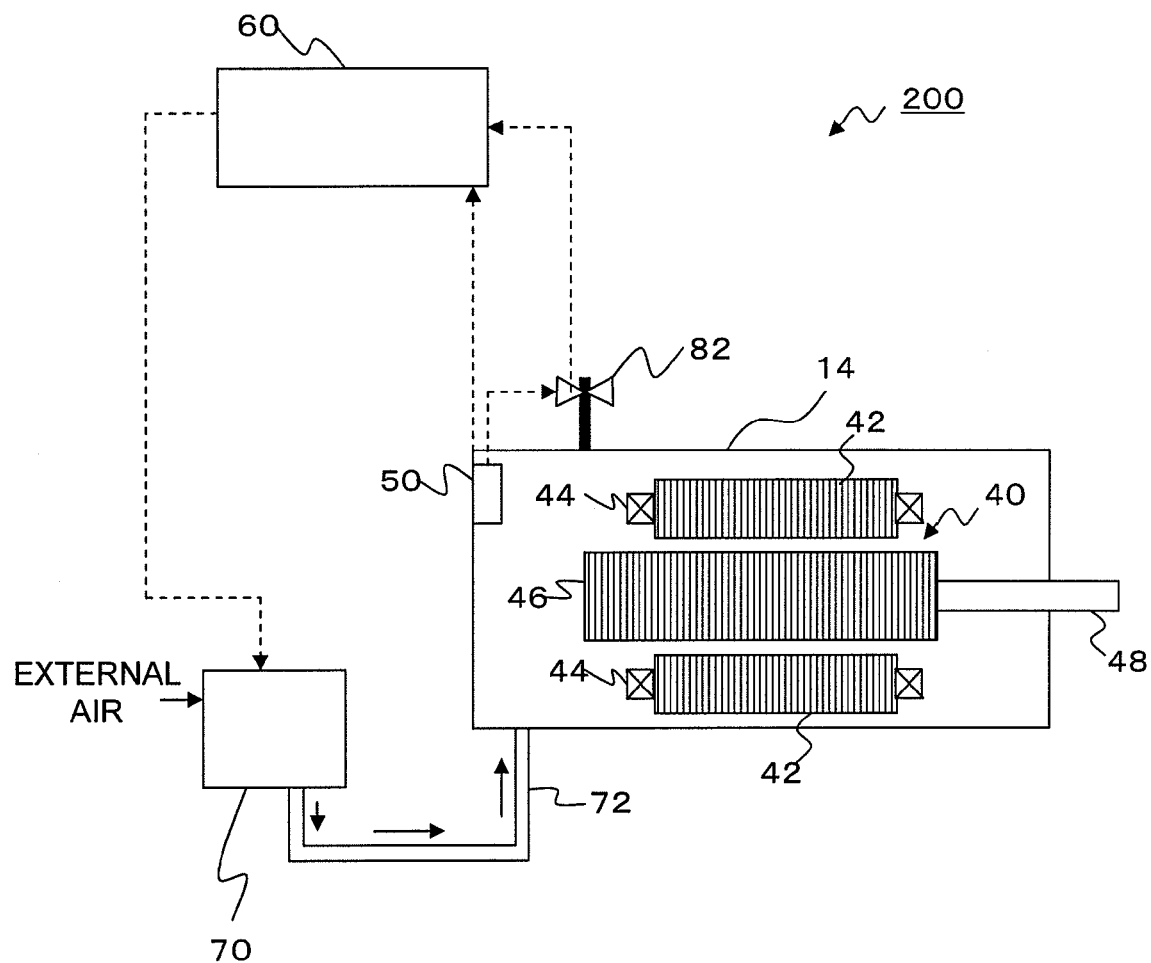
FIG. 2 is a structure diagram showing a schematic structure of a motor device mounted on a mobile body according to an embodiment of the present invention.

A motor device according to the present embodiment, which is to be mounted on a mobile body such as a hybrid electric vehicle or an electric vehicle, will be described below with reference to FIG. 2 through FIG. 9. As shown in FIG. 2, in a motor device 200 mounted on a mobile body according to the present embodiment, an axle shaft 48 for driving a travelling wheel 10 as shown in FIG. 1 is provided piercing through the motor 40 of the motor chamber 14 having a hermetic structure, a rotor 46 is attached to the axle shaft 48, and on the other hand, stators 42 and coils 44 are formed so as to face the rotor 46. Here, to provide a hermetic seal for the motor chamber 14, for example, an oil seal is formed in a gap between the rotor 46 of the motor 40 or the axle shaft 48 of the motor 40 and a bearing. The oil seal comprises three parts: a synthetic rubber, a metal ring, and a spring.

Further, the motor device 200 mounted on a mobile body according to the present embodiment has a pressure detection unit 50 that detects a chamber internal pressure of the motor chamber 14, a control unit 60 that controls a pressurizing mechanism 70 to operate in accordance with the output from the pressure detection unit 50, and the pressurizing mechanism 70 that produces compressed air in accordance with the output from the control unit 60. Here, the pressure detection unit 50 may employ, for example, a pressure sensor.

Further, as shown in FIG. 2, the pressurizing mechanism 70 and the motor chamber 14 are connected through a pipe 72. It should be noted that the pipe 72 may be provided with a pressure valve that opens and closes in accordance with the output from the control unit 60. Further, as shown in FIG. 2, the motor chamber 14 is provided with a safety valve 82 that can release the internal pressure when the chamber internal pressure becomes abnormal. It should be noted that although, in the present embodiment, a safety valve is provided for the motor chamber 14, it may be provided for the pipe 72.

Figure 3:
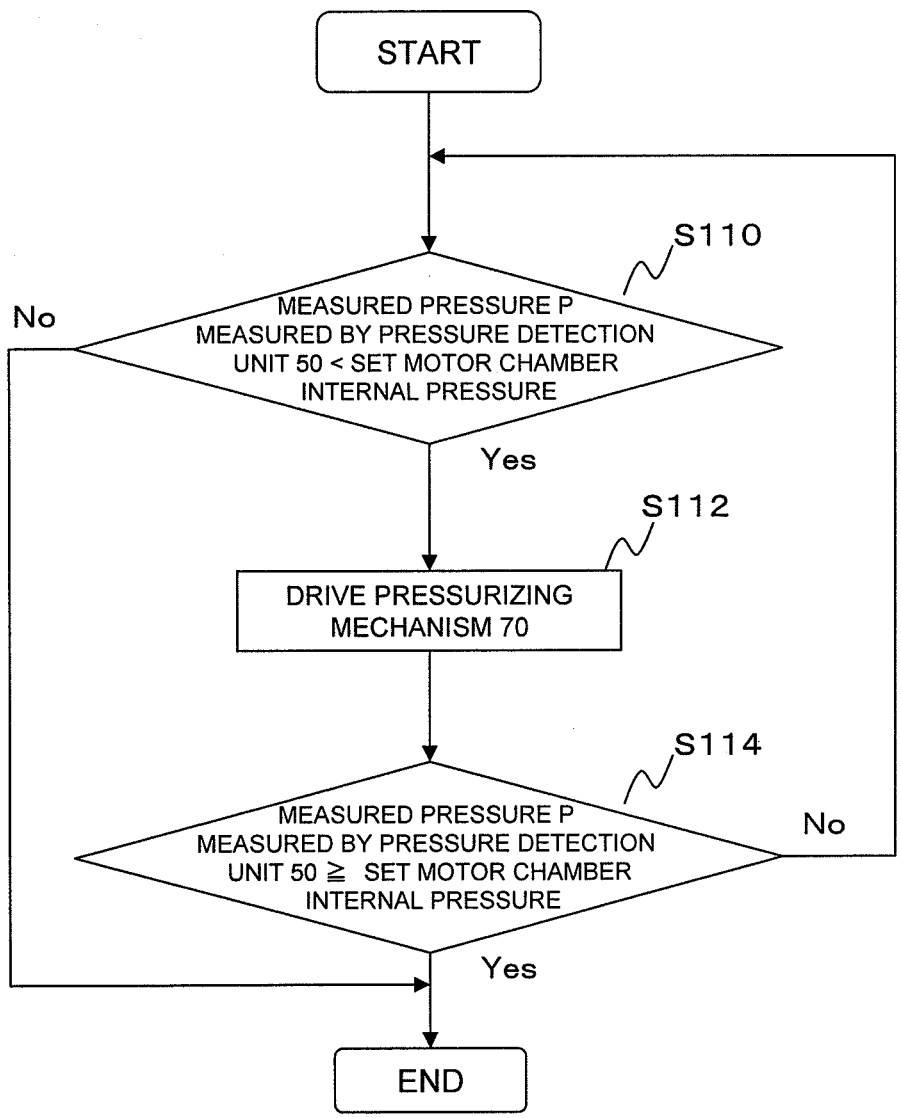
FIG. 3 is a flowchart illustrating an operation of pressurization control of a motor device mounted on a mobile body according to an embodiment of the present invention.

Next, an example of the operation of the motor device 200 mounted on a mobile body according to the present embodiment will be described with reference to FIG. 3. When the control unit 60 determines that a measured pressure P measured by the pressure detection unit 50 and input to the control unit 60 is lower than a set motor chamber internal pressure (S110), the control unit 60 drives the pressurizing mechanism 70 to supply compressed air into the motor chamber 14 (S112). After that, the control unit 60 suspends the driving of the pressurizing mechanism 70 when a measured pressure P measured by the pressure detection unit 50 and input to the control unit 60 becomes equal to or greater than the set motor chamber internal pressure (S114). Thus, it is possible to maintain the inside of the motor chamber 14 at a motor chamber internal pressure at which discharge does not occur.

On the other hand, if the pressure detection unit 50 detects that the chamber internal pressure of the motor chamber 14 becomes a pressure higher than the seal strength of the motor chamber, the safety valve 82 shown in FIG. 2 is opened to release some of the internal gas of the motor chamber 14 to the outside. The open operation of the safety valve 82 is transmitted to the control unit 60, and the safety valve 82 is closed after a predetermined chamber internal pressure is reached. Thus, the motor chamber internal pressure can be adjusted to an adequate chamber internal pressure at which discharge does not occur.

(First Embodiment)

Figure 4:
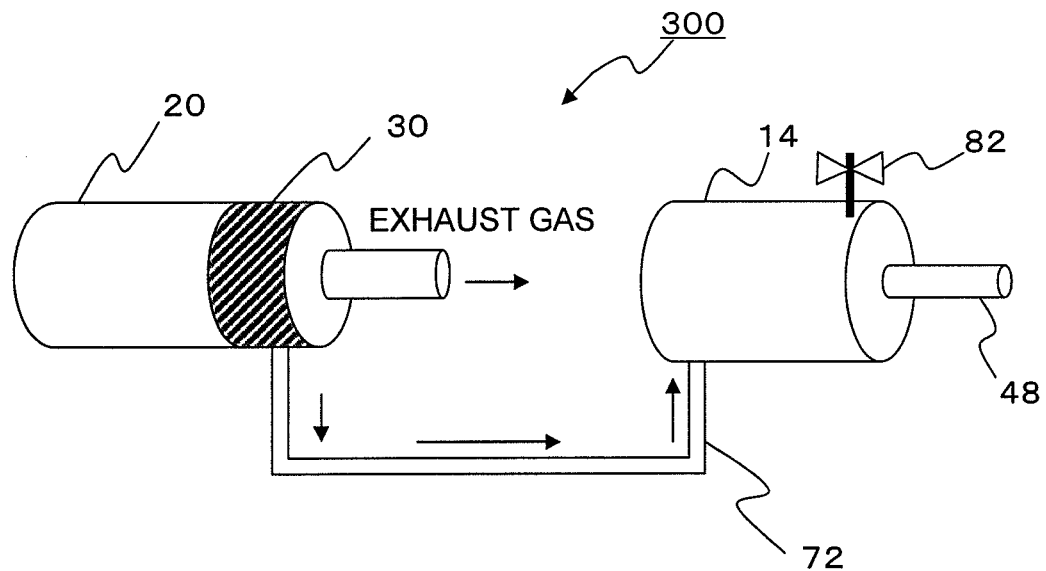
FIG. 4 is a structure diagram illustrating an example of a schematic structure of a motor device mounted on a mobile body according to a first embodiment of the present invention.

As shown in FIG. 4, in a motor device 300 mounted on a mobile body according to a first embodiment, a pressurizing mechanism for increasing the pressure in a motor chamber 14 in which a motor is installed has a compressor 30 which is driven to rotate by an engine 20 serving as driving means for driving the mobile body to produce compressed air for motor chamber pressurization, and the compressed air coming from the compressor 30 is fed into the motor chamber 14 through a pipe 72 almost constantly while the engine 20 is being driven.

The compressor 30, which may employ, for example, a turbocharger or a turbine, is driven using exhaust gas coming from the engine to produce compressed air. Therefore, because the compressor 30 is driven using exhaust coming from the engine 20, the energy consumption of the motor device 300 mounted on a mobile body can be reduced, and because the engine 20 already provided in the mobile body is used, the structure of the motor device 300 mounted on a mobile body can be simplified.

(Second Embodiment)

Figure 5:
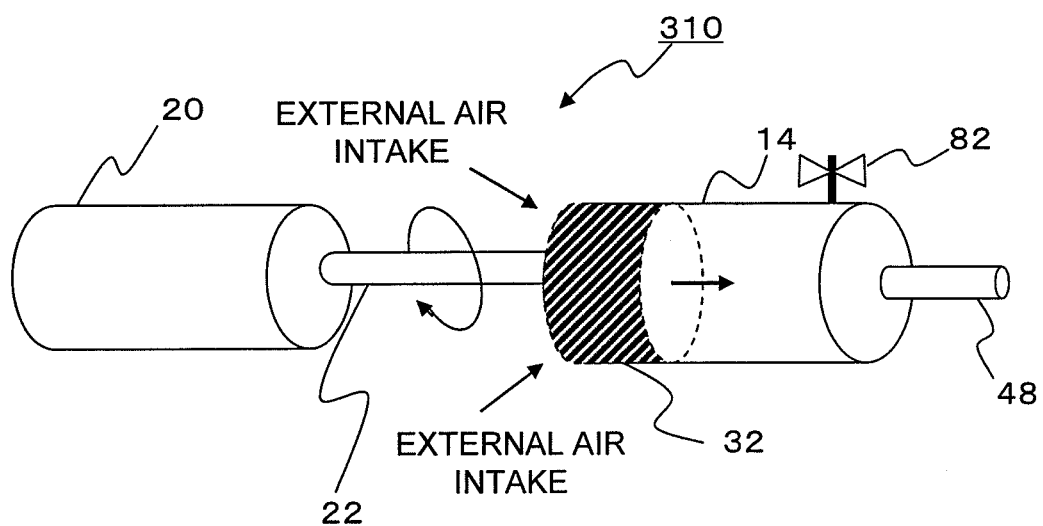
FIG. 5 is a structure diagram illustrating an example of a schematic structure of a motor device mounted on a mobile body according to a second embodiment of the present invention.

As shown in FIG. 5, in a motor device 310 mounted on a mobile body according to a second embodiment, a pressurizing mechanism for increasing the pressure in a motor chamber 14 in which a motor is installed has a compressor 32 which is driven to rotate by an output shaft 22 of an engine 20 serving as driving means for driving the mobile body, and the compressor 32 is integrated in the motor chamber 14, and produces compressed air for motor chamber pressurization to supply it directly into the motor chamber 14. Here, the compressed air coming from the compressor 32 is fed into the motor chamber 14 almost constantly while the engine 20 is being driven.

The compressor 32 may employ, for example, a turbocharger or a turbine, and because the compressor 32 is integrated in the motor chamber 14, the pipe 72 for feed as used in the first embodiment is unnecessary, which leads to a simpler structure and a lower cost. Further, because the compressor 32 is driven by the output shaft 22 of the engine 20, the energy consumption of the motor device 310 mounted on a mobile body can be reduced, and because the engine 20 already provided in the mobile body is used, the structure of the motor device 310 mounted on a mobile body can be simplified.

(Third Embodiment)

Figure 6:
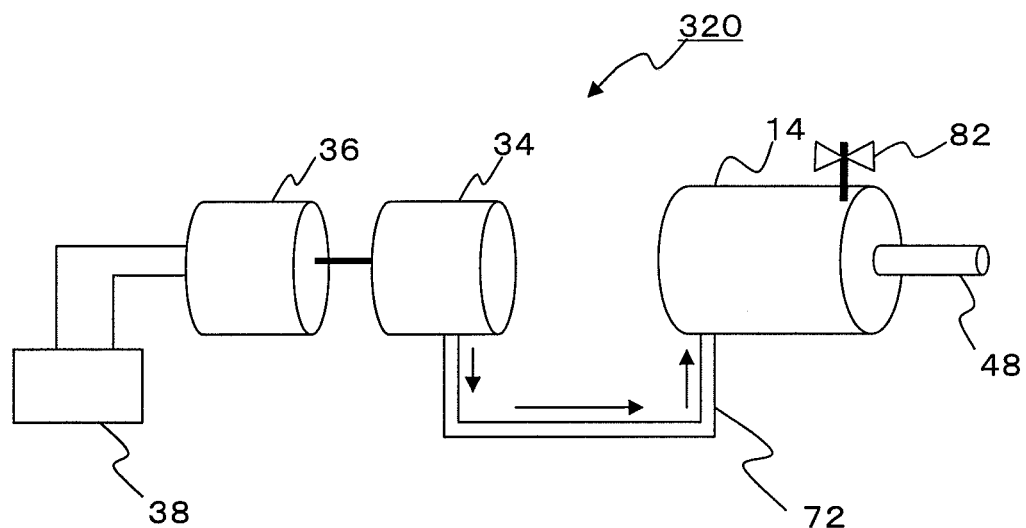
FIG. 6 is a structure diagram illustrating an example of a schematic structure of a motor device mounted on a mobile body according to a third embodiment of the present invention.

As shown in FIG. 6, in a motor device 320 mounted on a mobile body according to a third embodiment, a pressurizing mechanism for increasing the pressure in a motor chamber 14 in which a motor is installed has a compressor 34 which is driven by a dedicated motor 36 driven by power supply from a battery 38 to produce compressed air, and the compressed air coming from the compressor 34 is fed into the motor chamber 14 through a pipe 72. Here, the battery 38 may be controlled by the control unit 60 (FIG. 2) to supply power to the dedicated motor 36 in response to a drive signal from the control unit 60 in accordance with the internal pressure in the motor chamber 14.

In areas where the atmospheric pressure is low, such as at high elevations, the engine of a mobile body may become less efficient, and under such circumstances, for example, a hybrid vehicle may set the travel mode to a motor travel mode to suspend operation of the engine. During such suspension of operation of the engine, it is preferable that in order to produce compressed air, power is generated using the dedicated motor 36 to cause the compressor 34 to produce compressed air. Further, because the compressor 34 is driven by the dedicated motor 36, pressurization control can be selectively performed so that it is performed only under conditions where discharge tends to occur as there is, for example, a drop in the internal pressure of the motor chamber 14, and it is also possible to reduce energy loss.

(Fourth Embodiment)

Figure 7:
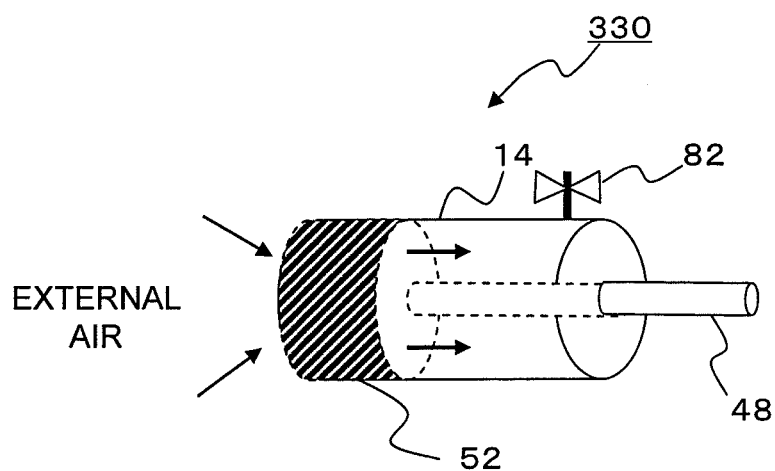
FIG. 7 is a structure diagram illustrating an example of a schematic structure of a motor device mounted on a mobile body according to a fourth embodiment of the present invention.

As shown in FIG. 7, in a motor device 330 mounted on a mobile body according to a fourth embodiment, a pressurizing mechanism for increasing the pressure in a motor chamber 14 in which a motor is installed has a compressor 52 which is driven to rotate by an axle shaft 48 serving as an output shaft of the motor, and the compressor 52 is integrated in the motor chamber 14, and produces compressed air for motor chamber pressurization to supply it directly into the motor chamber 14.

The compressor 52 may employ, for example, a turbocharger or a turbine, and because the compressor 52 is integrated in the motor chamber 14, the pipe 72 for feed as used in the first embodiment is unnecessary, which leads to a simpler structure and a lower cost. Further, even during suspension of operation of the engine at high elevations as has been described in connection with the third embodiment, compressed air can be produced, and the internal pressure in the motor chamber 14 can be increased. Further, as the motor is typically rotating at high rpm when discharge may occur under the application of a high voltage to the motor, by supplying compressed air into the motor chamber 14 by means of the compressor 52 that is driven to rotate coaxially with the output shaft of the motor when it is rotating at high rpm, it is possible to efficiently prevent discharge from occurring. Further, because the compressor 52 is driven by the motor itself, the energy consumption of the motor device mounted on a mobile body can be reduced, and because the motor device mounted on a mobile body has a compact structure, and does not take up much space when mounted on a mobile body, it may be applied to any type of mobile body, and provides increased versatility.

(Fifth Embodiment)

Figure 8:
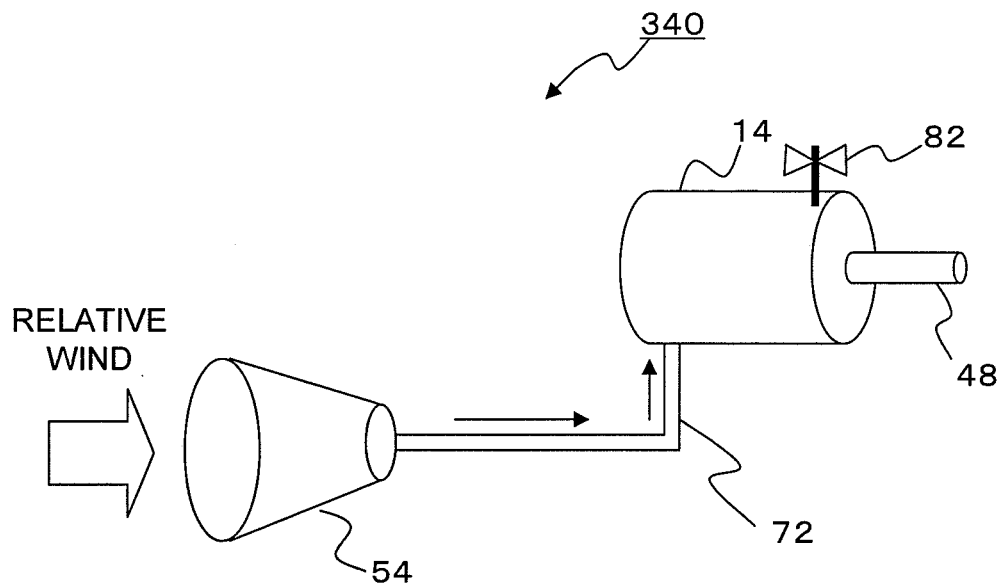
FIG. 8 is a structure diagram illustrating an example of a schematic structure of a motor device mounted on a mobile body according to a fifth embodiment of the present invention.

As shown in FIG. 8, in a motor device 340 mounted on a mobile body according to a fifth embodiment, a pressurizing mechanism for increasing the pressure in a motor chamber 14 in which a motor is installed has a compressor 54 which uses relative wind (the flow of air relative to the mobile body, caused by its motion through the air) to produce compressed air based on a ram pressure, and the compressed air coming from the compressor 54 is fed into the motor chamber 14 through a pipe 72 almost constantly while the engine 20 is being driven. Here, the ram pressure is a wind pressure applied to the front of a mobile body, and by appropriately adjusting the size of a relative-wind inlet of the compressor 54 and the size of a relative-wind outlet, which serves as an inlet port to the pipe 72, it is possible to produce compressed air with different degrees of compression.

With the above-described structure, cost reduction is achieved without providing a special external-air compressing mechanism. Further, as, for example, a hybrid vehicle has a proportional relationship between the driving conditions and the rotational speed of the motor, when the motor is rotating at high rpm at which discharge may occur, the vehicle speed is also sufficiently high, and a sufficient ram pressure can also be obtained. Therefore, by employing a pressurizing mechanism which produces compressed air using a wind pressure applied to the front of a mobile body, or, in other words, a ram pressure, when it is travelling at high speed, the energy consumption of the motor device mounted on a mobile body is minimized, and because the motor device mounted on a mobile body has a compact structure, and does not take up much space when mounted on a mobile body, it may be applied to any type of mobile body, and provides increased versatility.

(Sixth Embodiment)

Figure 9:
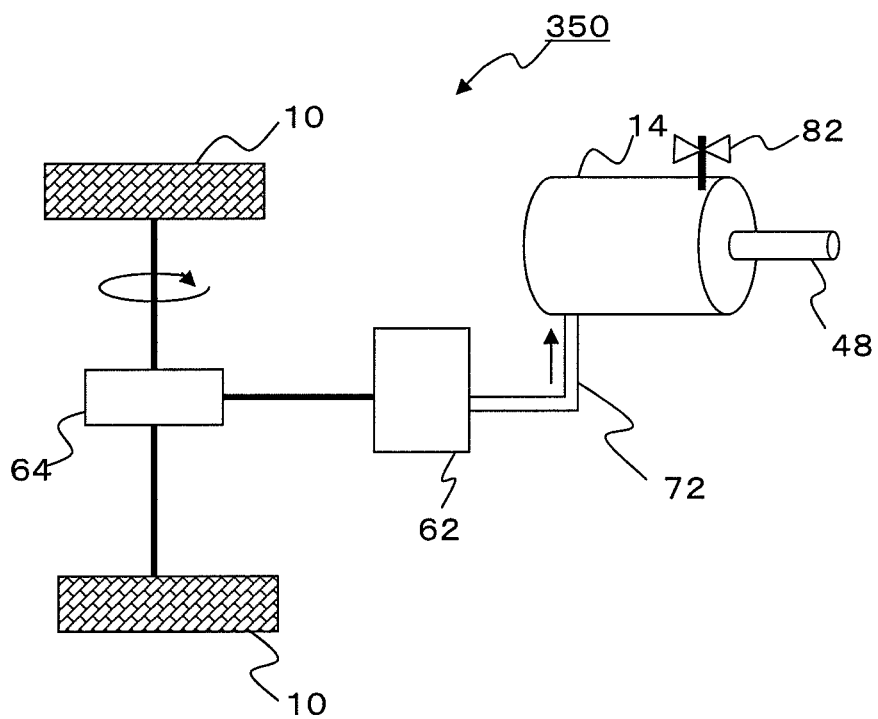
FIG. 9 is a structure diagram illustrating an example of a schematic structure of a motor device mounted on a mobile body according to a sixth embodiment of the present invention.

As shown in FIG. 9, in a motor device 350 mounted on a mobile body according to a sixth embodiment, a pressurizing mechanism for increasing the pressure in a motor chamber 14 in which a motor is installed has a compressor 64 which converts a braking force of the mobile body into a driving force to produce compressed air for motor chamber pressurization. More specifically, the compressor 64 is provided on an axle shaft of wheels 10, regenerative energy is used to drive the compressor 64, compressed air produced by the compressor 64 is held in a pressure vessel 62, and the compressed air is supplied, as necessary, from the pressure vessel 62 into the motor chamber 14. Here, the pressure vessel 62 is provided with a solenoid valve (not shown), which is caused to open and close in response to a control signal from the control unit 60 (FIG. 2), and supplies the compressed air in accordance with the internal pressure in the motor chamber 14.

Because a braking force is used to increase the pressure in the motor chamber, the energy consumption of the motor device 350 mounted on a mobile body can be reduced. Further, even during suspension of operation of the engine or the motor of the mobile body, it is possible to supply compressed air into the motor chamber 14.

According to the present invention, it is possible to provide a motor device mounted on a mobile body that prevents motor insulation deterioration, and has excellent durability, and a mobile body having such a motor device mounted thereon.

It should be noted that although the present invention has been described in detail, the scope of the present invention is not limited to the embodiments described above.

Further, the disclosure of Japanese Patent Application No. 2007-140126 filed on May 28, 2007, including the specification, claims, drawings, and abstract, is incorporated herein by reference in its entirety.

INDUSTRIAL APPLICABILITY

The motor device mounted on a mobile body according to the present invention is useful for a motor which is mounted in a hybrid electric vehicle or an electric vehicle, and is also suitable for application to a motor which is used in high-voltage and low-pressure environments.

The invention claimed is:

1. A motor device mounted on a mobile body, the motor device comprising a pressurizing mechanism for increasing a pressure in a motor chamber in which a motor is installed;
   a pressure detection unit for detecting an internal pressure in the motor chamber; and
   a control unit including instructions to perform:
      controlling the pressurizing mechanism in accordance with an output from the pressure detection unit to adjust the internal pressure in the motor chamber to a motor chamber internal pressure at about one atmosphere at which motor discharge does not occur so as to suppress deterioration of an insulation treatment film applied to the motor,
   wherein
   the pressurizing mechanism has a compressor which is driven to rotate by driving means for driving the mobile body to produce compressed air for motor chamber pressurization.

2. The motor device mounted on the mobile body according to claim 1, wherein:
   when a measured pressure measured by the pressure detection unit is lower than a set motor chamber internal pressure, the control unit drives the pressurizing mechanism to supply compressed air into the motor chamber; and
   when a measured pressure measured by the pressure detection unit becomes equal to or greater than the set motor chamber internal pressure, the control unit suspends driving of the pressurizing mechanism.

3. The motor device mounted on the mobile body according to claim 1, wherein:
   the driving means is an engine; and
   the compressor is a compressor which is driven to rotate by exhaust from the engine to produce compressed air for motor chamber pressurization.

4. The motor device mounted on the mobile body according to claim 1, wherein:
   the driving means is an engine; and
   the compressor is a compressor which is driven to rotate by an output shaft of the engine to produce compressed air for motor chamber pressurization.

5. A mobile body having mounted thereon the motor device according to claim 1.

6. A mobile body having mounted thereon the motor device according to claim 2.

7. A mobile body having mounted thereon the motor device according to claim 3.

8. A mobile body having mounted thereon the motor device according to claim 4.

* * * * *